(12) United States Patent
Syrett

(10) Patent No.: US 8,392,336 B1
(45) Date of Patent: Mar. 5, 2013

(54) ASSESSING AN ABILITY TO LEVERAGE A NETWORK

(75) Inventor: Matthew Syrett, Los Angeles, CA (US)

(73) Assignee: IMDb.com Inc., Seattle, WA (US)

( * ) Notice: Subject to any disclaimer, the term of this patent is extended or adjusted under 35 U.S.C. 154(b) by 321 days.

(21) Appl. No.: 12/827,006

(22) Filed: Jun. 30, 2010

(51) Int. Cl.
*G06Q 10/00* (2012.01)
(52) U.S. Cl. .......................................... 705/319; 705/1.1
(58) Field of Classification Search ............... 705/1, 319
See application file for complete search history.

(56) References Cited

U.S. PATENT DOCUMENTS

| | | | | |
|---|---|---|---|---|
| 2006/0200435 | A1* | 9/2006 | Flinn et al. ...................... | 706/12 |
| 2009/0326970 | A1* | 12/2009 | Estrada et al. .................... | 705/1 |

OTHER PUBLICATIONS

FORBES.COM, LLC, "The Celebrity 100—Forbes.com," 2010, located at <http://www.forbes.com/lists/2009/53/celebrity-09_The-Celebrity-100_Rank.html>, last accessed on Dec. 9, 2010, 2 pages.

IMDb, Inc., "Road to the Oscars 2009, STARmeter™ Top 25 for 2008," 1990-2009, located at <http://www.imdb.com/features/rto/2009/starmeter>, last accessed on Dec. 9, 2010, 4 pages.

The Ulmer Scale, "The Ulmer Scale, You can bank on it®," 1997-2010, located at <http://www.ulmerscale.com>, last accessed on Dec. 9, 2010, 2 pages.

U.S. Appl. No. 12/822,840, filed Jun. 24, 2010, for Matthew Syrett.

* cited by examiner

*Primary Examiner* — Gabrielle McCormick
(74) *Attorney, Agent, or Firm* — Novak Druce Connolly Bove + Quigg LLP

(57) ABSTRACT

Systems and methods are provided for determining an individual's ability to leverage a network of connections. For example, the systems and methods can be used to assess an entertainment professional's ability to leverage his network of connections with other entertainment professionals to obtain opportunities to work on movie projects. An entertainment professional's ability to leverage his network of connections may correspond to the entertainment professional's success in the entertainment profession. Accordingly, by assessing an entertainment professional's ability to effectively leverage his network of connections with other entertainment professionals, the systems and methods may be able to make observations regarding the success of the entertainment professional.

26 Claims, 5 Drawing Sheets

ASSESSING AN ABILITY TO LEVERAGE A NETWORK

BACKGROUND

Networking commonly refers a method used by individuals to develop relationships and, as a result, obtain professional opportunities. For example, networking often includes creating a network of connections with individuals and then leveraging the network of connections to obtain opportunities from the connected individuals. To create a network, an individual establishes direct connections with other individuals who may potentially help the individual obtain opportunities. Oftentimes, when an individual establishes direct connections with other individuals, ripple effects occur, causing an exponential increase in the number of connections in the individual's network. For example, when one individual establishes a direct connection with another individual, a ripple effect often occurs, resulting in an exponential increase in the number of connections in each individual's network. The direct connection from one individual to another has the added benefit of connecting each individual with the other individual's prior connections, thereby allowing each individual to further expand his network, i.e., creating a ripple effect that exponentially builds upon itself. Once an individual has established a network of connections with other individuals, that individual can leverage those connections to obtain opportunities from the connected individuals.

Networking is particularly useful in industries where individuals typically rely on referrals to obtain opportunities. For example, in the movie industry, actors, crew members, and above-the-line talent, such as directors, producers, and screenwriters, commonly rely on referrals from other actors, crew members, and above-the-line talent to obtain opportunities to work on movie projects. Accordingly, the size and composition of an individual's network and the individual's ability to leverage that network is important to, and to some extent an indicator of, the individual's success in the movie business. As an individual becomes more successful, the individual is better able to leverage his network of connections because the connected individuals are more likely to favorably respond to the individual. Accordingly, there exists a correlation between an individual's success and that individual's ability to leverage his network of connections.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
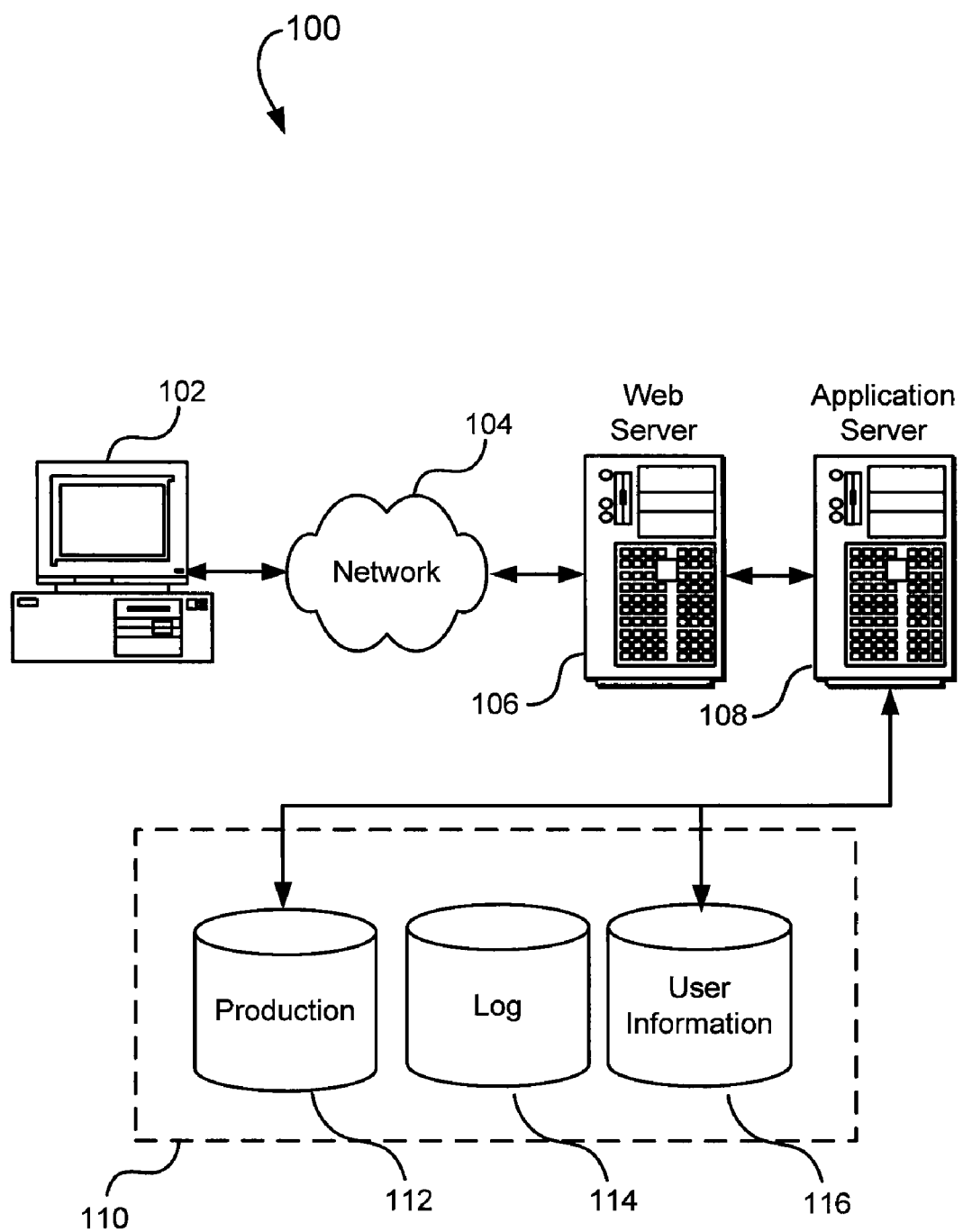
FIG. 1 is a schematic diagram illustrating an environment for implementing aspects, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Systems and methods are provided for determining an individual's ability to leverage a network of connections. For example, the systems and methods can be used to assess an entertainment professional's ability to leverage his network of connections with other entertainment professionals to obtain opportunities to work on entertainment projects (e.g., movies, plays, television series, commercials, etc.). An entertainment professional's ability to leverage his network of connections may correspond to the entertainment professional's success in the entertainment profession. For example, if an entertainment professional is able to effectively leverage his network of connections, then the network may yield opportunities that are sufficient in number and type to make the entertainment professional successful if the entertainment professional effectively capitalizes on those opportunities. Accordingly, by assessing an entertainment professional's ability to effectively leverage his network of connections with other entertainment professionals, the systems and methods are able to make observations regarding the success of the entertainment professional. For example, other entertainment professionals, such as directors, performers, producers and top-billed talent, may consider these networking-based observations regarding the success of the entertainment professional when determining whether to hire or recommend the entertainment professional for a movie project. Further, for example, movie enthusiasts may review these networking-based observations regarding the success of the entertainment professional for entertainment purposes. It should be understood, however, that the examples disclosed herein are not exhaustive and that many other embodiments would be apparent to one of ordinary skill in the art in light of the teachings and suggestions contained herein. Further, while many examples discussed herein refer to assessing an entertainment professional's ability to leverage a network of connections with other entertainment professionals, it should be understood that various embodiments of the systems and methods are suitable for assessing the networking ability of many other types of individuals or entities.

It will be helpful to have a brief overview of a method for assessing an entertainment professional's ability to leverage a network of connections with other entertainment professionals. According to this example, the network of connections to be leveraged is the entertainment professional's network of connections with other entertainment professionals, such as actors, crew members, directors, producers, performers, and screenwriters. Because, as discussed above, an entertainment professional's ability to leverage his network of connections may correspond to the entertainment professional's success in the entertainment profession, the provided assessment of the entertainment professional's ability to leverage his network of connections may be useful to individuals who are interested in evaluating the entertainment professional's success in the entertainment profession. For example, filmmakers, such as directors and producers, may refer to the provided assessment of the entertainment professional's ability to leverage his network of connections when considering whether to hire the entertainment professional to work on a film project. Filmmakers may be more inclined to hire the entertainment professional if the assessment provided according to the method indicates that the entertainment professional demonstrates the ability to effectively leverage his network of connections. For example, filmmakers may be more inclined to hire the entertainment professional because the entertainment professional—due to his demonstrated networking capabilities—may attract other successful entertainment professionals to work on the project and may generate interest in the movie project.

According to this example, for a selected entertainment professional, embodiments identify the selected entertainment professional's first-tier connections. First-tier connections, for purposes of this example, are entertainment professionals who have worked on a movie with the selected entertainment professional. To identify the first-tier professionals, embodiments identify the movies on which the selected entertainment professional has worked. For example, to identify these movies, embodiments search the movie credits of a plurality of movies for the selected entertainment professional's name. Then, for each movie identified as being a movie on which the selected entertainment professional worked, embodiments identify the other entertainment professionals who worked on that movie. Those identified entertainment professionals are labeled as being the selected entertainment professional's first-tier connections. For example, to identify other entertainment professionals who worked on one of the movies on which the selected entertainment professional worked, embodiments identify the other entertainment professionals listed in that movie's credits.

After identifying first-tier connections, embodiments identify the selected entertainment professional's second-tier connections. Second-tier connections, for purposes of this example, are entertainment professionals who have not worked on a movie with the selected entertainment professional but who have worked on a movie with one of the selected entertainment professional's first-tier connections. To identify the second-tier connections, embodiments identify the movies on which the each of the first-tier connections have worked but on which the selected entertainment professional has not worked. For example, to identify these movies, for each first-tier connection, embodiments identify the movies for which that first-tier connection's name, but not the selected entertainment professional's name, is listed in the movie's credits. Then, for each of these identified movies, embodiments identify the entertainment professionals who worked on that movie but who have not worked on a different movie with the selected entertainment professional, and then label those identified entertainment professionals as being the selected entertainment professional's second-tier connections. For example, to identify the entertainment professionals who worked on a particular movie but who have not worked on a movie with the selected entertainment professional, embodiments identify the entertainment professionals listed in the movie's credits and then, from those entertainment professionals listed in the movie's credits, eliminate the entertainment professionals who were previously identified as being one of the selected entertainment professional's first-tier connections.

In sum, according to this example, to identify the selected entertainment professional's second-tier connections, certain embodiments: (1) identify the movies on which each of the first-tier connections have worked but on which the selected entertainment professional has not worked; and (2) for each of these identified movies, identify as being a second-tier connection the entertainment professionals who worked on the movie but who have not worked on a different movie with the selected entertainment professional.

After identifying the selected entertainment professional's first- and second-tier connections, embodiments, according to this example, obtain a rating for the selected entertainment professional and for each of the first- and second-tier connections. According to this example, the rating is a popularity rating, which represents an entertainment professional's recognition in society and/or in the movie industry. For example, the popularity may be based on each of the selected entertainment professional's or the first- or second-tier connection's individual STARmeter™ as determined by IMDb.com, Inc. An entertainment professional's STARmeter™ is based on the number of "pageviews" received by a web page that is on the IMBd.com website and that is associated with that entertainment professional. Further, according to other embodiments, the rating is a bankability rating or value. Bankability, for example, is an estimated or predicted ability of an entertainment professional to raise funding for a project simply by having that entertainment professional's name attached to the project. For purposes of this example, the rating obtained for the selected entertainment professional and for each of the first- and second-tier connections is the popularity rating, which, as mentioned above, represents the respective popularity of the selected entertainment professional, the first-tier connections, and the second-tier connections. Although, for purposes of this example, the rating is a popularity rating, it should be appreciated that the rating could be any type of rating that could affect an individual's ability to leverage a network or connections. For example, the rating could be related to the entertainment professional's wealth, talent, intelligence, attractiveness, likability, etc.

After obtaining popularity ratings, embodiments identify the first- and second-tier connections whose popularity ratings are less than the selected entertainment professional's popularity rating. For each of the first- and second-tier connections whose popularity rating is less than the selected entertainment professional's popularity rating, embodiments determine a leverage indicator for the connection/relationship between the selected entertainment professional and the first- or second-tier connection. To determine a leverage indicator, according to this example, embodiments calculate the difference between the entertainment professional's popularity rating and the popularity rating of the first- or second-tier connection. According to this example, a leverage indicator is indicative of the amount of leverage the selected entertainment professional has in the relationship between the selected entertainment professional and the first- or second-tier connection. The higher the leverage indicator, the more likely the selected entertainment professional will be able to leverage the relationship in an attempt to obtain an opportunity from the relationship or to use the relationship to advance an opportunity. For example, to obtain an opportunity, if a relationship is between the selected entertainment professional and a director, then the selected entertainment professional may be able to leverage the relationship to obtain an opportunity to work on a movie directed by the director. Also, for example, to advance an opportunity, if a relationship is between the selected entertainment professional and a particularly skilled film editor who is hard to hire because of his high demand, then the selected entertainment professional may be able to leverage his relationship with the film editor to convince the film editor to work on a movie that the selected entertainment professional is already working on, thus improving the movie and advancing an opportunity that the selected entertainment professional already had.

Although, for purposes of this example, leverage indicators are determined for the first- and second-tier connections whose popularity ratings are less than the selected entertainment professional's popularity rating, it should be appreciated that leverage indicators could be determined for all of the first- and second-tier connections, regardless of their popularity rating.

Next, according to this example, embodiments calculate a networking-power value that represents the selected entertainment professional's ability to leverage his network of first- and second-tier connections. To do so, according to this example, embodiments aggregate the leverage indicators that were calculated for the relationships between the selected entertainment professional and the first- and second-tier connections whose popularity ratings are less than the popularity rating of the entertainment professional. According to this example, the networking-power value is a normalized value of the aggregated leverage indicators. The calculated networking-power value may be referred to by filmmakers, such as directors and producers, considering whether to hire the entertainment professional to work on a film project. For example, as mentioned above, filmmakers may be more inclined to hire the entertainment professional if the entertainment professional has a high networking-power value, which indicates that the entertainment professional likely has the ability to effectively leverage his network of first- and second-tier connections.

According to some examples, after aggregating leverage indicators but before calculating the networking-power value, embodiments determine the average or median popularity rating of the selected entertainment professional's first-tier connections and/or second-tier connections, and then combine the value of the aggregated leverage indicators with the average or median popularity to calculate a normalized value that represents the entertainment professional's networking power. Combining the average or median popularity rating of the first- and second-tier connections with a value that represents the entertainment professionals leverage over those first- and second-tier connections results in a networking-power value that represents the utility of the entertainment professional's network of connections. The higher the median or average popularity of the first- and second-tier connections, the more useful those connections are for helping the entertainment professional obtain or advance opportunities.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing log data 114, which may be utilized for purposes such as reporting and analysis. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
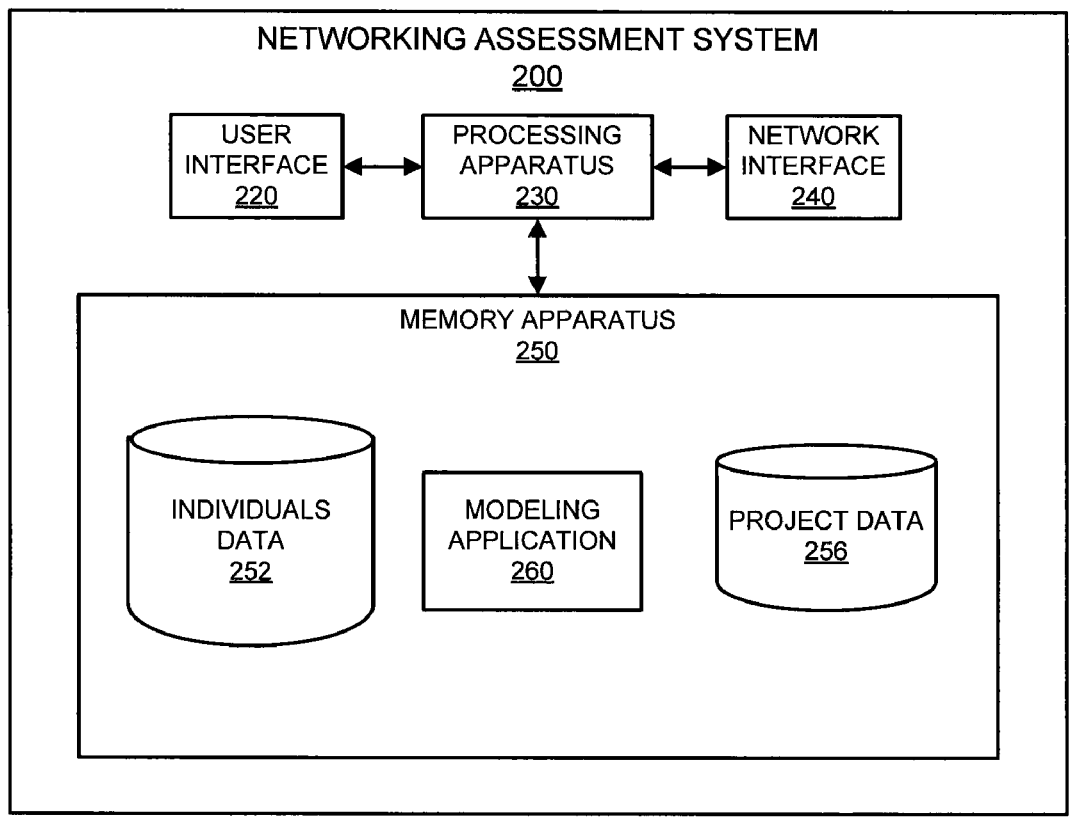
FIG. 2 is a block diagram depicting aspects of a system, in accordance with at least one embodiment.

It will be helpful to refer to an example system configured for determining an individual's ability to leverage a network of connections. FIG. 2 provides a block diagram of one such networking assessment system 200. The networking assessment system 200 comprises a user-interface apparatus 220, a network-interface apparatus 240, and a memory apparatus 250 operatively coupled to a processing apparatus 230.

As described in greater detail below, embodiments of the networking assessment system 200 are generally configured to assess an individual's, such as an entertainment professional, ability to leverage a network of connections with other individuals, such as other entertainment professionals, to obtain opportunities, such as opportunities to work on movie projects. To do so, embodiments of the networking assessment system 200 receive a request or query to assess an individual's ability to leverage a network of connections. Embodiments of the networking assessment system 200 then: (1) identify the first- and second-tier connections in requested individual's network of connections; (2) obtain a normalized rating for the requested individual and for each of the first- and second-tier connections; (3) identify the first- and second-tier connections whose ratings are less than the requested individual's rating; (4) for each relationship between the requested individual and the first- and second-tier connections whose ratings are less than the requested individual's rating, determine a leverage indictor for the relationship by calculating the difference between the requested individual's rating and the first- or second-tier connection's rating; and (5) normalize the aggregate of the leverage indicators to provide a value that represents the requested individual's ability to leverage the network of first- and second-tier connections. In this regard, according to at least some embodiments, the networking assessment system 200 is owned, maintained, operated by, and/or operated on behalf of institutions that have access to a data store of information related to individuals, such as entertainment professionals. The networking assessment system 200 may, in some embodiments, be integrated with other systems and environments, such as environment 100, of such institution and may share at least some hardware, software, and/or other resources with such other systems and environments.

It should be, for example, appreciated that the individual could be an actor, a director, a writer, a performer, a producer, a model, a screenwriter, or any other type of professional. Further, it should be appreciated that a project could be any live or recorded performance, such as a movie, a TV show, a photo shoot, a fashion show, a musical or dance performance, etc. It should also be appreciated that, instead of or in addition to determining the networking ability of an individual, embodiment could determine the networking ability of an entity, such as, for example, a production company, a film company, a studio, a talent agency, etc.

It should be appreciated that the networking assessment system 200 may be owned or maintained or operated by a third party that, upon receipt of a request from a subscriber, assesses requested individuals' abilities to leverage networks of connections. For example, subscribers may submit a request that includes identifying information for a particular individual, such as an entertainment professional. In response to the request, the third party, using the networking assessment system 200, assesses the requested individual's ability to leverage his networks of connections.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art in light of the present description that, although FIG. 2 illustrates the user interface 220, network interface 240, memory apparatus 250, and processing apparatus 230 as separate blocks in the block diagram, these separations may be merely conceptual. In other words, in some instances, the user interface 220, for example, is a separate and distinct device from the processing apparatus 230 and the memory apparatus 250 and therefore may have its own processor, memory, and software. In other instances, however, the user interface 220 is directly coupled to or integral with at least one part of the processing apparatus 230 and at least one part of the memory apparatus 250 and includes the user interface input and output hardware used by the processing apparatus 230 when the processing apparatus 230 executes user input and output software stored in the memory apparatus 250.

As will be described in greater detail below, in one embodiment, the networking assessment system 200 is entirely contained within a user terminal, such as a personal computer or mobile terminal, while, in other embodiments, the networking assessment system 200 includes a central computing system, one or more network servers, and one or more user terminals in communication with the central computing system via a network and the one or more network servers. FIG. 2 is intended to cover both types of configurations as well as other configurations that will be apparent to one of ordinary skill in the art in view of this disclosure.

The user interface 220 includes hardware and/or software for receiving input into the networking assessment system 200 from a user and hardware and/or software for communicating output from the networking assessment system 200 to a user. In some embodiments, the user interface 220 includes one or more user input devices, such as a keyboard, keypad, mouse, microphone, touch screen, touch pad, controller, and/or or the like. In some embodiments, the user interface 220 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 240 is configured to receive electronic input from other devices in the network 104, including the data store 110. In some embodiments, the network interface 240 is further configured to send electronic output to other devices in a network.

The processing apparatus 230 includes circuitry used for implementing communication and logic functions of the networking assessment system 200. For example, the processing apparatus 230 may include a digital signal processor device, a microprocessor device, and various analog-to-digital converters, digital-to-analog converters, and other support circuits. Control and signal processing functions of the networking assessment system 200 are allocated between these devices according to their respective capabilities. The processing apparatus 230 may include functionality to operate one or more software programs based on computer-readable instructions thereof, which may be stored in the memory apparatus 250. As described in greater detail below, in one embodiment the memory apparatus 250 includes a modeling application 260 stored therein for instructing the processing apparatus 230 to perform one or more operations of the procedures described herein and in reference to FIGS. 3-5. Some embodiments may include other computer programs stored in the memory apparatus 250.

In general, the memory apparatus 250 is communicatively coupled to the processing apparatus 230 and includes at least one non-transitory computer-readable storage medium for storing computer-readable program code and instructions, as well as data stores containing data and/or databases. More particularly, the memory apparatus 250 may include volatile memory, such as volatile Random Access Memory (RAM) including a cache area for the temporary storage of data. The memory apparatus 250 may also include non-volatile memory that can be embedded and/or may be removable. The non-volatile memory can, for example, comprise an EEPROM, flash memory, or the like. The memory apparatus 250 can store any of a number of pieces of information and data used by the networking assessment system 200 to implement the functions of the networking assessment system 200 described herein.

In the illustrated embodiment, the memory apparatus 250 includes data stores containing individuals data 252 and project data 256. According to some embodiments, individuals data 252 includes, for example, information about individuals who have worked on at least one project. In some embodiments, the individuals data 252, for each individual, provides information about the projects that individual has worked on. Further, in some embodiments, the individuals data 252 includes rating information for each of the individuals. For example, rating information may include an individual's popularity rating and bankability. The popularity ratings, for example, may be the individuals' STARmeters™ as determined by IMDb.com, Inc., where an individual's STARmeter™ is based on the number of "pageviews" received by a web page that is on the IMBd.com website and that is associated with that individual. Further, according to other embodiments, the bankability rating or value may be an estimate or prediction regarding the ability of an individual to raise funding for a project simply by having that individual's name attached to the project.

Further, according to some embodiments, the individuals data 252 includes—for each individual—one or more lists of the individual's first- and second-tier connections. For each individual, these lists of first- and second-tier connections may be updated on a regular basis, such as once per day, once per week, etc. Additionally, according to some embodiments, the individuals data 252 includes—for each individual—a networking-power value that indicates the individual's ability to leverage a network of connections. The networking-power value, for example, may be calculated according to processes 300, 400, and/or 500, which are described below with reference to FIGS. 3-5. The networking assessment system 200 may calculate and store in the individuals data 252 the networking-power value of each individual on a regular basis, such as once per day, once per week, etc. Also, according to some embodiments, the individuals data 252 includes a rank-ordered list of the individuals who are included in the individuals data 252. The list is rank-ordered based, at least in part, on the networking-power value of each individual. For example, the highest ranked individual is the individual who, according to her networking-power value, has the greatest ability to leverage her network, whereas the lowest ranked individual is the individual who has the least ability to leverage his network. The networking assessment system 200 may update the rank-ordered list on a regular basis. According to some embodiments, a user may access the networking assessment system 200 via the user interface 220 and instruct the processing apparatus 230 to obtain the rank-ordered list from the individuals data 252 and then display the rank-ordered list. Reviewing the rank-ordered list enables the user to generally assess the rank-ordering and networking-power values of all listed individuals or to obtain the rank-order and networking-power value of a particular individual who is included in the list.

According to some embodiments, the project data 256 includes information about projects, such as movies, live performances, photo shoots, fashion shows, etc. In some embodiments, for each project, the project data 256 includes information about the individuals who worked on the project.

As discussed in more detail below, in some embodiments, linkages may be provided between the individuals of the individuals data 252 and the corresponding project data 256. Further, in some embodiments, individuals data 252 and/or project data 256 may be received from a user via the user interface 220, or may be obtained through electronic communication with another device, which may obtain the data from external data sources via the network 104 and then stored in the memory apparatus 250.

For the sake of clarity and ease of description, the figures provided herein generally illustrate the individuals data 252 and the project data 256 as each being separate from one another. However, it will be understood that, in some embodiments, these data stores may be combined or the data described as being stored within such data stores may be further separated into additional data stores. For example, the individuals data 252 may include the project data 256, or the project data 256 may include the individuals data 252.

In one embodiment, data within each of the data stores shown in FIG. 2 may be linked to, and thus organized around, a unique identification stored in the memory apparatus 250. In such case, unique identifications are assigned to each of the individuals. Thus, each identification is linked within the memory apparatus 250 to: (1) information relating to the individual in the individuals data 252 and (2) project data relating to the individual within the project data 256. The identifications may be input by the user via the user interface 220, and may be stored by the processing apparatus 230 in any of the data stores or in a separate data store within the memory apparatus 250. Furthermore, the user may create the linkages in the memory device 250 between the identifications and the data within the data stores utilizing the user interface 220.

As further illustrated by FIG. 2 and as briefly mentioned above, the memory apparatus 250 also includes the modeling application 260. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, the modeling application 260 includes computer-readable instructions for instructing the processing apparatus 230 and/or other devices to perform one or more of the functions described herein, such as one or more of the functions described in FIGS. 3-5.

Figure 3:
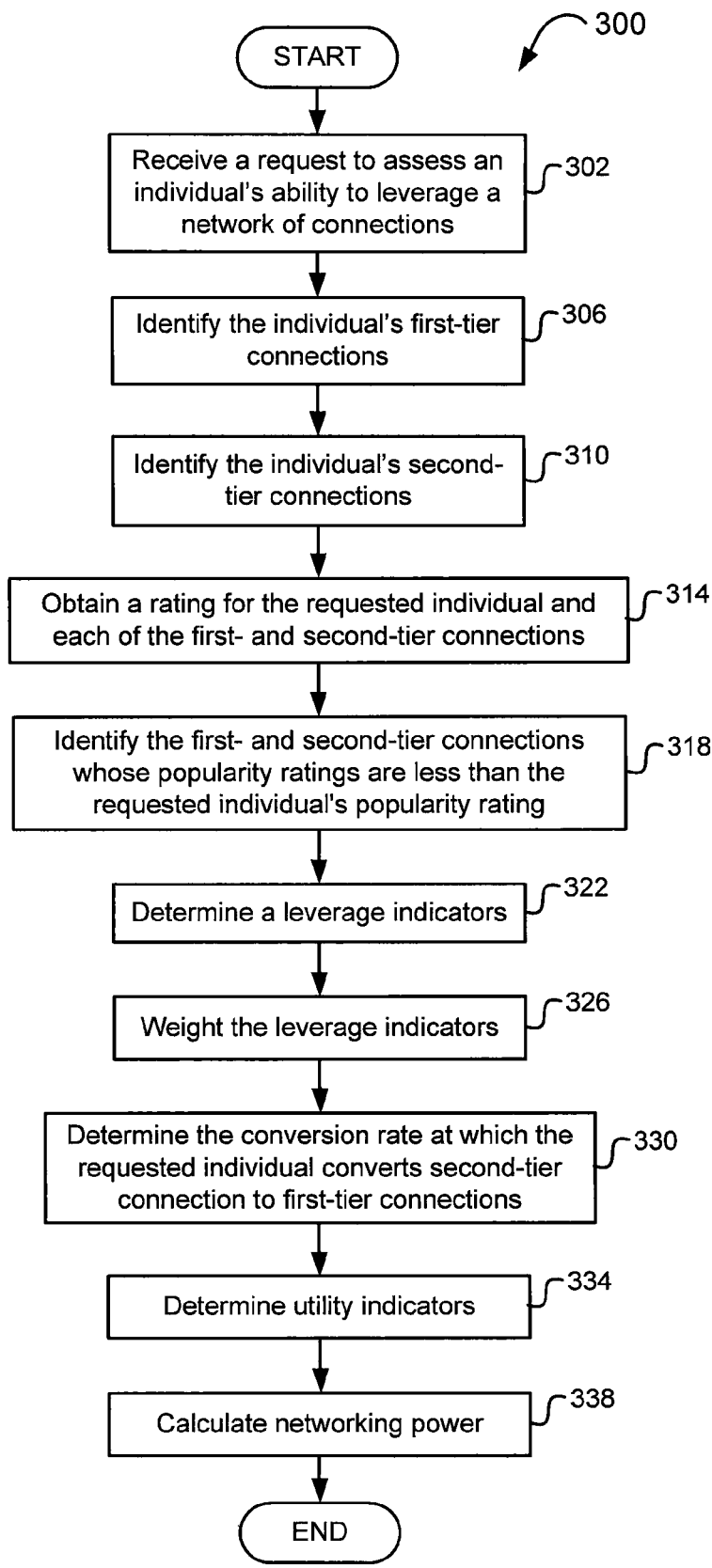
FIG. 3 provides a flow diagram illustrating a process whereby the system of FIG. 2 is used to assess an individual's ability to leverage a network of connections, in accordance with at least one embodiment.

FIG. 3 provides a flow diagram illustrating a process 300 whereby the networking assessment system 200 is used to assess an individual's ability to leverage a network of connections and to provide a value that indicates the individual's networking power. As described above, in some embodiments, the requested individual is an entertainment professional and the network of connections to be leveraged is the entertainment professional's network of connections with other entertainment professionals, such as actors, crew members, directors, producers, and screenwriters. It should be appreciated that embodiments are not limited to individuals and that some embodiments determine the networking ability of entities, such as bands, performance groups, production companies, etc. Further, in some embodiments, the projects are movies, live performances, fashion shows, photo shoots, etc.

Figure 4:
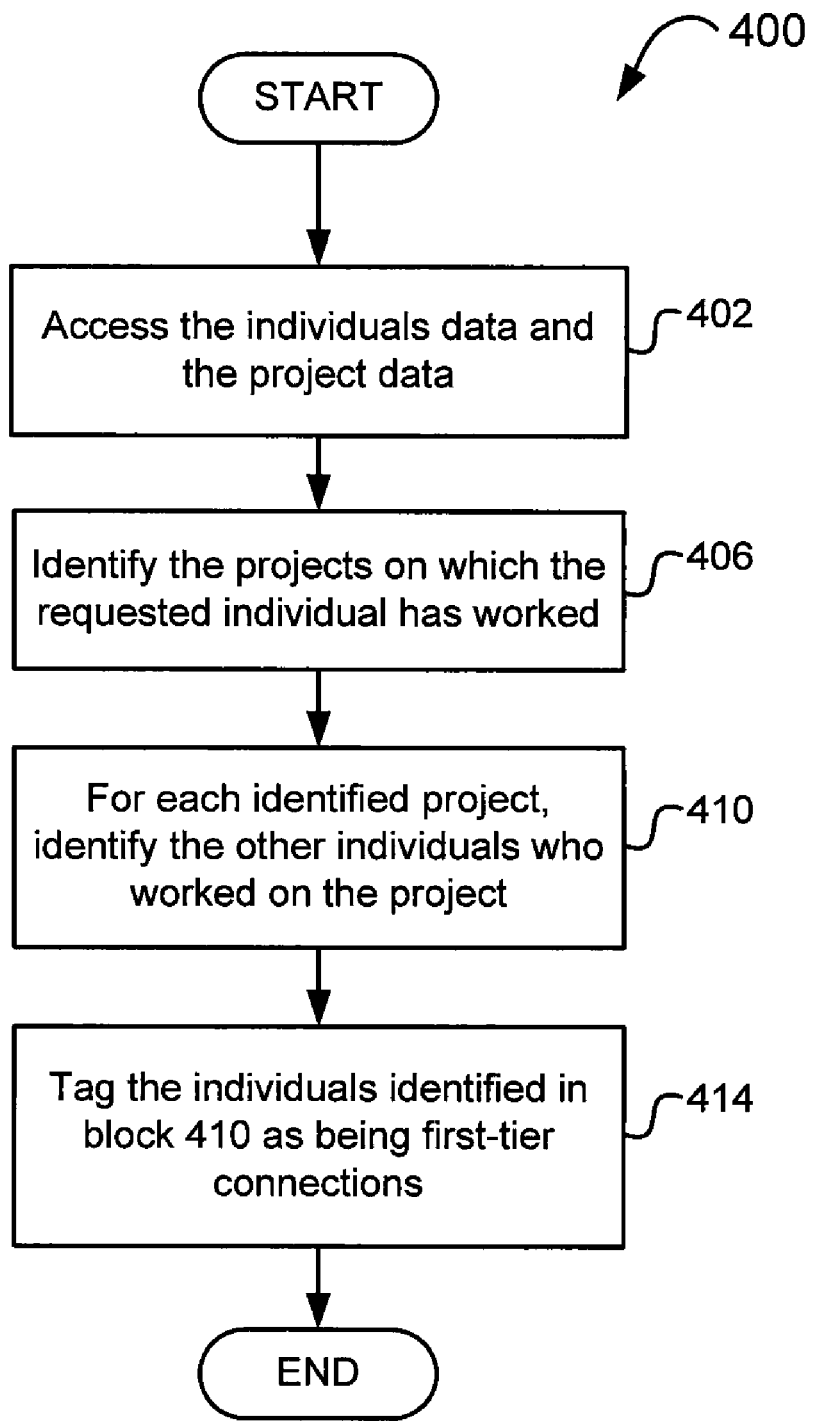
FIG. 4 provides a flow diagram illustrating a process whereby the system of FIG. 2 is used to identify an individual's first-tier connections, in accordance with at least one embodiment.

Referring to FIG. 3, as represented by block 302, according to some embodiments, the networking assessment system 200 receives via the user interface 220 a request to assess an individual's ability to leverage a network of connections. After receiving the request, as indicated at block 306, the modeling application 260 instructs the processing apparatus 230 to identify the requested individual's first-tier connections. FIG. 4 provides a flow diagram illustrating a process 400 whereby the networking assessment system 200 identifies the requested individual's first-tier connections, which, according to the illustrated embodiment, are individuals who have worked on a project with the requested individual. As indicated at block 402, the modeling application 260 first instructs the processing apparatus 230 to access the individuals data 252 and the project data 256. Then, as indicated at block 406, the modeling application 260 instructs the processing apparatus 230 to identify the projects on which the requested individual has worked. For example, the modeling application 260 instructs the processing apparatus 230 to identify the projects on which the requested individual has worked. It should be appreciated that, instead of instructing the processing apparatus 230 to access the individuals data 252 and the project data 256, the modeling application 260 could instruct the processing apparatus 230 to access either the individuals data 252 or the project data 256 to identify the projects on which the requested individual has for worked.

According to some embodiments, in the event the requested individual is an entertainment professional and the projects are movies, the modeling application 260 instructs the processing apparatus 230 to access the project data 256 and then search the movie credits of each of the movies listed in the project data 256 to identify the movies for which the requested individual's name is included the movie credits. Thus identification is made of the movies on which the requested individual has worked.

Next, for each project identified as being a project on which the selected individual worked, the modeling application 260, as indicated in block 410, instructs the processing apparatus 230 to identify the other individuals that worked on that project. To do so, according to some embodiments, the modeling application 260 instructs the processing apparatus 230 to locate in the project data 256 each project identified as being a project on which the requested individual worked and identify the other individuals who worked on the project. Also, according to some embodiments, the modeling application 260 instructs the processing apparatus 230 to search the individuals data 252 for individuals who worked on the project.

In the event the requested individual is an entertainment professional and the projects are movies, the modeling application 260, according to some embodiments, when executing the stop represented at block 410, instructs the processing apparatus 230 to access the project data 256 and, for each movie identified as being a movie on which the selected entertainment professional worked, identify the other entertainment professionals listed in the movie's credits as being entertainment professionals who worked on the movie with the requested entertainment professional.

Next, as indicated at block 414, the modeling application 260 instructs the processing apparatus 230 to tag or label the individuals who were identified as being individuals who have worked on projects with the requested individual as first-tier connections.

Referring again to FIG. 3, after identifying the requested individual's first-tier connections, the modeling application 260, as indicated at block 310, instructs the processing apparatus 230 to identify the requested individual's second-tier connections. According to some embodiments, second-tier connections are individuals who have not worked on a project with the requested individual but who have worked on a project with one of the requested individual's first-tier connections. Although the illustrated embodiment describes the modeling application 260 instructs the processing apparatus 230 to identify the requested individual's first- and second-tier connections, it should be appreciated that the modeling application 260 could instruct the processing apparatus 230 to identify the requested individual's third-tier connections, fourth-tier connections, and so on.

Figure 5:
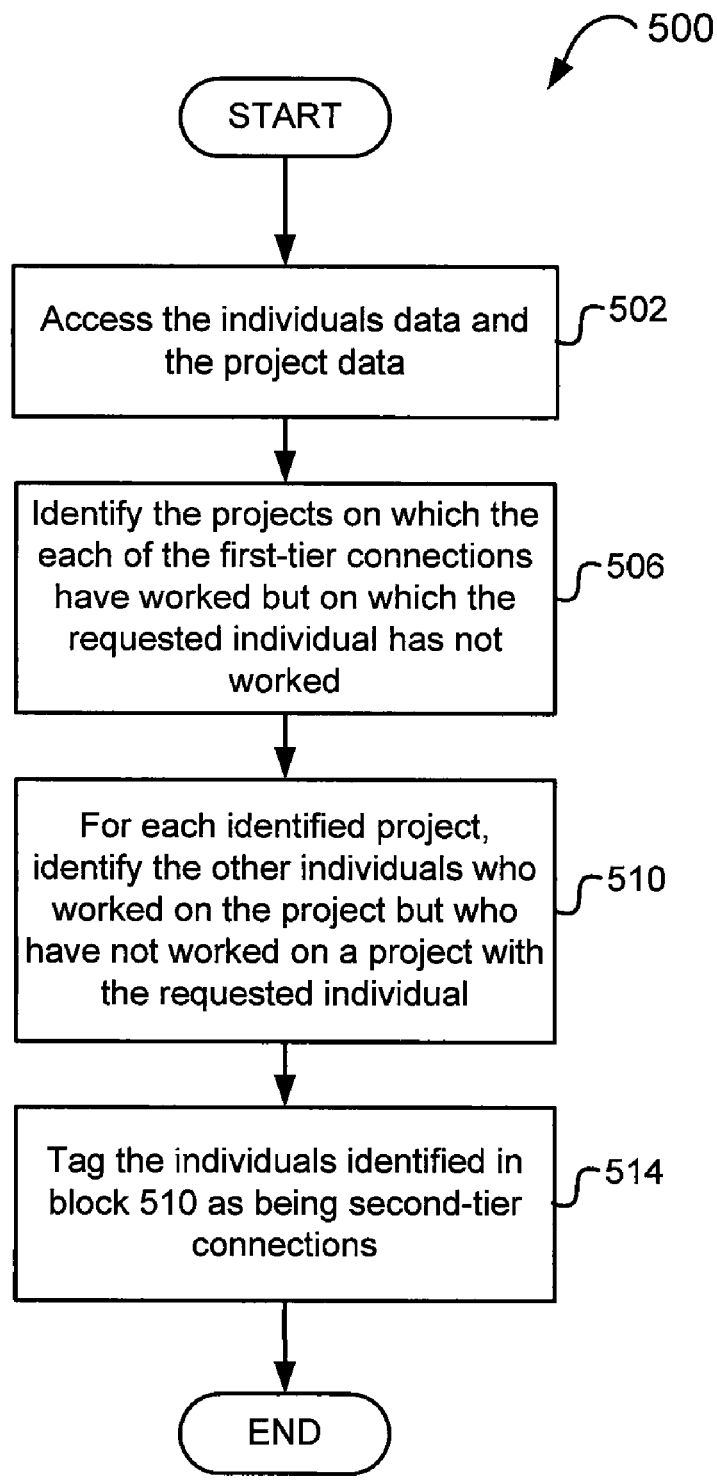
FIG. 5 provides a flow diagram illustrating a process whereby the system of FIG. 2 is used to identify an individual's second-tier connections, in accordance with at least one embodiment.

FIG. 5 provides a flow diagram illustrating a process 400 whereby the networking assessment system 200 identifies the requested individual's second-tier connections. As indicated at block 502, the modeling application 260 instructs the processing apparatus 230 to access the individuals data 252 and the project data 256. Then, as indicated at block 506, the modeling application 260 instructs the processing apparatus 230 to identify the projects on which each of the first-tier connections have worked but on which the requested individual has not worked. Then, as indicated at block 510, the modeling application 260 instructs the processing apparatus 230 to identify, for each project identified according to block 506, the other individuals who worked on the project but who have not worked on a project with the requested individual.

To execute the steps represented at blocks 506 and 510, the modeling application 260 instructs the processing apparatus 230 to identify—for each first-tier connection—the projects on which that first-tier connection worked, but on which the requested individual did not work. Then, for each of these projects, the modeling application 260 instructs the processing apparatus 230 to identify the individuals who worked on that project but who have not worked on a project with the requested individual. To do so, the modeling application 260 instructs the processing apparatus 230 to identify the individuals who worked on the project and then eliminate from those individuals the individuals who were previously identified as being one of the requested individual's first-tier connections.

For example, in the event the requested individual is an entertainment professional and the projects are movies, to identify the movies on which the each of the first-tier connections has worked but on which the requested entertainment professional has not worked, the modeling application 260 instructs the processing apparatus 230 to identify—for each first-tier connection—the movies for which that first-tier connection's name, but not the requested entertainment professional's name, is listed in the movie's credits. Then, for each of these identified movies, the modeling application 260 instructs the processing apparatus 230 to identify the entertainment professionals who worked on that movie but who have not worked on a movie with the selected entertainment professional by identifying the entertainment professionals listed in the movie's credits and then eliminate from those entertainment professionals listed in the movie's credits the entertainment professionals who were previously identified as being one of the requested entertainment professional's first-tier connections.

Next, as indicated at block 514, after the individuals who are the requested individual's second-tier connections are identified, the modeling application 260 instructs the processing apparatus 230 to tag or label the identified individuals as being the requested individual's second-tier connections.

According to some embodiments, upon receiving a request, as indicated at block 302, the modeling application 260 instructs the processing apparatus 230 to access the individuals data 252 and obtain the list or lists of the requested individual's first- and/or second-tier connections. Accordingly, in this embodiment, the modeling application 260 bypasses the steps indicated at blocks 306 and 310 and processes 400 and 500.

Referring again to FIG. 3, after identifying the requested individual's first- and second-tier connections, the modeling application 260, as indicated at block 314, instructs the processing apparatus 230 to obtain a rating for the requested individual and for each of the first- and second-tier connections. According to some embodiments, the rating is a popularity rating, which represents a requested individual's recognition in society or an industry, such as the movie industry. According to some embodiments, the popularity may be based on each of the selected individual's or the first- or second-tier connection's individual STARmeter™ as determined by IMDb.com, Inc. An individual's STARmeter™ is based on the number of "pageviews" received by a web page that is on the IMBd.com website and that is associated with that individual. Further, according to other embodiments, the rating is a bankability rating or value. Bankability, for example and as mentioned above, is an estimated or predicted ability of an individual to raise funding for a project simply by having that individual's name attached to the project.

For purposes of the illustrated embodiment, the rating obtained for the selected individual and for each of the first- and second-tier connections is a popularity rating, which represents the respective popularity of the selected individual, the first-tier connections, and the second-tier connections. Although, for purposes of this embodiment, the rating is a popularity rating, it should be appreciated that the rating could be any type of rating that could indicate an individual's ability to leverage a network or connections. For example, the rating could be related to the individual's wealth, talent, political aptitude, intelligence, attractiveness, likability, etc.

After obtaining popularity ratings, the modeling application 260, as indicated at block 318, instructs the processing apparatus 230 to identify the first- and second-tier connections whose popularity ratings are less than the requested individual's popularity rating. Then, as indicated at block 322, for each of the first- and second-tier connections whose popularity rating is less than the requested individual's popularity rating, the modeling application 260 instructs the processing apparatus 230 to determine a leverage indicator for the connection/relationship between the requested individual and the first- or second-tier connection. To determine a leverage indicator, according to some embodiments, the modeling application 260 instructs the processing apparatus 230 calculate the difference between the requested individual's popularity rating and the popularity rating of the first- or second-tier connection. According to some embodiments, a leverage indicator is indicative of the amount of leverage the requested individual has in the relationship between the requested individual and the first- or second-tier connection. The higher the leverage indicator, the more likely the requested individual will be able to leverage the relationship in an attempt to obtain an opportunity from the relationship or to use the relationship to advance an opportunity. Although leverage indicators in the illustrated embodiment are determined for the first- and second-tier connections whose popularity ratings are less than the requested individual's popularity rating, it should be appreciated that leverage indicators could be determined for all of the first- and second-tier connections, regardless of their popularity rating.

According to some embodiments, after determining leverage indicators, the modeling application 260, as indicated at block 326, instructs the processing apparatus 230 to weight the leverage indicators such that the relationships between the requested individual and the first-tier connections have more weight than the relationships between the requested individual and the second-tier connections. To do so, for example, the modeling application 260 instructs the processing apparatus 230 to assign a higher weight to leverage indicators for relationships between the requested individual and first-tier connections than to leverage indicators for relationships between the requested individual and second-tier connections. For example, the processing apparatus 230 may weight leverage indicators for relationships between the requested individual and first-tier connections twice as high as leverage indicators for relationships between the requested individual and second-tier connections. This weighting reflects the relative leverage that an individual would have in a relationship with someone he has worked with compared to the leverage the individual would have in a relationship with someone he has not actually worked with.

According to some embodiments, after weighting the leverage indicators, the modeling application 260, as indicated at block 330, instructs the processing apparatus 230 to calculate the conversion rate that the requested individual converts second-tier connections to first-tier connections. According to some embodiments, the requested individual converts a second-tier connection to a first-tier connection by working on a project with the second-tier connection. Accordingly, to calculate a conversion rate, the modeling application 260, according to an embodiment, instructs the processing apparatus 230 determine the number of instances in a given period of time where the requested individual converts a relationship by working on a project with an individual who was previously a second-tier connection. A high conversion rate could indicate that the requested individual is growing his network by strengthening his connectivity with multiple people.

According to some embodiments, after calculating conversion rates, the modeling application 260, as indicated at block 334, instructs the processing apparatus 230 to determine a utility indicator for each of the relationships between the requested individual and the first- and second-tier connections. To do so, the modeling application 260, according to an embodiment, instructs the processing apparatus 230 to combine the leverage indicator of each relationship with the popularity rating of the first- or second-tier connection in the relationship to calculate a normalized value that represents the utility of the relationship. In some embodiments, the utility indicator is directly proportional to the popularity rating of the first- or second-tier connection and to the leverage indicator, which represents the amount of leverage the individual has in the relationship between the individual and the first- or second-tier connection. Accordingly, the higher the popularity of the first- or second-tier connection, then the more useful the relationship is to the requested individual. Likewise, the higher the leverage, then the more useful the relationship is to the requested individual. Individuals with the strongest networking power have high leverage indicators for a lot of relationships with first- and second-tier connections who have high popularity ratings. It should be appreciated that instead of popularity ratings, bankability or other types of ratings could be used to determine the utility indicator of a relationship.

Next, according to some embodiments, the modeling application 260, as indicated at block 338, instructs the processing apparatus 230 to calculate a networking-power value that represents the requested individual's ability to leverage the network of first- and second-tier connections. To do so, for example, the modeling application 260 instructs the processing apparatus 230 to aggregate the weighted or non-weighted leverage indicators that were calculated for the relationships between the requested individual and the first- and second-tier connections. According to some embodiments, the modeling application 260 instructs the processing apparatus 230 to aggregate the weighted or non-weighted leverage indicators that were calculated for just the relationships between the requested individual and the first- and second-tier connections whose popularity ratings are less than the popularity rating of the entertainment professional. Further, according to other embodiments, when calculating the networking-power value for the requested individual, the modeling application 260 instructs the processing apparatus 230 to consider the conversation rate of the requested individual and/or the utility indicators for each of the relationships between the requested individual and the first- and second-tier relationship.

According to some embodiments, upon receiving a request, as indicated at block 302, the modeling application 260 instructs the processing apparatus 230 to access the rank-ordered list of individuals, which is maintained in the individuals data 252, and obtain from the rank-ordered list the requested individual's networking-power value, including the individual's relative position on the list. Accordingly, in this embodiment, the modeling application 260 bypasses processes 300, 400 and 500.

According to some embodiments, the modeling application 260 instructs the processing apparatus 230 to execute aspects of processes 300, 400, and 500 on a regular basis so as to update the lists, which—as mentioned above—are stored in the individuals data 252, of first- and second-tier connections and the rank-ordered list of individuals which is rank-ordered based on the individuals' networking-power values. Accordingly, a user can quickly assess the lists to view an individual's network of first- and second-tier connections, to view an individual's networking-power value, to view an individual's relative position on the rank-ordered list, and/or to view the entire rank-ordered list of individuals.

According to some embodiments, the networking-power value is a normalized value that accounts for the aggregated weighted or non-weighted leverage indicators, the aggregated utility indicators, and/or the conversation rate. The calculated networking-power values provided by the networking assessment system 200 may be referred to by employers when considering whether to hire individuals to work on projects. For example, the networking-power values may be referred to by filmmakers, such as directors and producers, when considering which entertainment professionals to hire to work on film projects. For example, as mentioned above, filmmakers may be more inclined to hire an entertainment professional if the entertainment professional has a high networking-power value, which indicates that the entertainment professional likely has the ability to effectively leverage his network of first- and second-tier connections.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self-organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer-readable media for containing code, or portions of code, may include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by a system device. Program modules, program components and/or programmatic objects may include computer-readable and/or computer-executable instructions, of and/or corresponding to, any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of determining a networking power of an entertainment professional, the computer-implemented method comprising:
   identifying, by at least one processor of one or more computer systems, first-tier connections from a network of individuals, each of the first-tier connections being an individual who has worked on an entertainment project with the entertainment professional;
   identifying, by the at least one processor of the one or more computer systems, second-tier connections from the network of individuals, each of the second-tier connections being an individual who has not worked on any entertainment project with the entertainment professional but who has worked on an entertainment project with at least one of the first-tier connections;
   obtaining, by the one or more computer systems, a popularity rating of the entertainment professional and of each of the first- and second-tier connections;
   identifying, by the at least one processor of the one or more computer systems, the first- and second-tier connections whose popularity rating is less than the popularity rating of the entertainment professional;

for each of the first- and second-tier connections whose popularity rating is less than the popularity rating of the entertainment professional, determining, by the at least one processor of the one or more computer systems, a leverage indicator for a relationship between the entertainment professional and the first- or second-tier connection by calculating the difference between the popularity rating of the entertainment professional and the popularity rating of the first- or second-tier connection, the leverage indicator being indicative of an amount of leverage the entertainment professional has in the relationship between the entertainment professional and the first- or second-tier connection; and determining, by the at least one processor of the one or more computer systems, the networking power of the entertainment professional by aggregating the leverage indicators for the relationships between the entertainment professional and each of the first- and second-tier connections whose popularity ratings are less than the popularity rating of the entertainment professional.

2. The computer-implemented method of claim 1, further comprising:
weighting, by the at least one processor of the one or more computer systems, leverage indicators for the relationships between the entertainment professional and each of the first-tier connections to have more weight than leverage indicators for the relationships between the entertainment professional and each of the second-tier connections.

3. The computer-implemented method of claim 1, further comprising:
determining, by the at least one processor of the one or more computer systems, a conversion rate of the entertainment professional by calculating the rate at which the second-tier connections of the entertainment professional are converted to the first-tier connections; and
applying, by the at least one processor of the one or more computer systems, the conversion rate to adjust the networking power of the entertainment professional.

4. The computer-implemented method of claim 3, wherein a second-tier connection of the entertainment professional is converted to a first-tier connection by the entertainment professional being in an entertainment project with the second-tier connection.

5. The computer-implemented method of claim 1, wherein the entertainment professional is at least one of an actor, a director, a writer, or a producer.

6. A computer-implemented method of determining a networking power of an individual, the computer-implemented method comprising:
identifying, by at least one processor of one or more computer systems, as first-tier connections, a plurality of individuals who have worked with the individual on at least one previous project;
obtaining, by the of one or more computer systems, a rating of the individual and of each of the first-tier connections;
for each of the first-tier connections, determining, by the at least one processor of the one or more computer systems, a leverage indicator for a relationship between the individual and the first-tier connection by comparing the rating of the individual with the rating of the first-tier connection, the leverage indicator being indicative of an amount of leverage the individual has in the relationship between the individual and the first-tier connection; and
determining, by the at least one processor of the one or more computer systems, the networking power of the individual at least in part by aggregating leverage indicators for the relationships between the individual and each of the first-tier connections.

7. The computer-implemented method of claim 6, further comprising:
determining, by the at least one processor of the one or more computer systems, the networking power of a collection of individuals; and
rank-ordering, by the at least one processor of the one or more computer systems, the collection of individuals based at least in part on the determined networking power of each of the collection.

8. The computer-implemented method of claim 6, wherein the networking power of the individual is calculated by aggregating leverage indicators for the relationships between the individual and each of the first-tier connections whose rating is less than the rating of the individual.

9. The computer-implemented method of claim 6, further comprising:
for each of the first-tier connections, identifying, by the at least one processor of the one or more computer systems, as second-tier connections, a second plurality of individuals who have worked with the first-tier connection on a previous project but who have not worked with the individual on any previous project.

10. The computer-implemented method of claim 9, further comprising:
weighting, by the at least one processor of the one or more computer systems, leverage indicators for the relationships between the individual and each of the first-tier connections to have more weight than leverage indicators for the relationships between the individual and each of the second-tier connections.

11. The computer-implemented method of claim 9, further comprising:
determining, by the at least one processor of the one or more computer systems, a conversion rate of the individual, the conversion rate being indicative of the rate at which the second-tier connections of the individual are converted to first-tier connections; and
applying the conversion rate to adjust the networking power of the individual.

12. The computer-implemented method of claim 9, further comprising:
obtaining, by the one or more computer systems, a popularity rating of each of the first- and second-tier connections; and
calculating, by the at least one processor of the one or more computer systems, a utility indicator for the relationships between the individual and each of the first- and second-tier connections by combining the leverage indicator of each relationship with the popularity rating of the respective first- or second-tier connection, the utility indicator being directly proportional to the popularity rating of the respective first- or second-tier connection and to the leverage indicator, which represents the amount of leverage the individual has in the relationship between the individual and the respective first- or second-tier connection.

13. The computer-implemented method of claim 11, wherein each second-tier connection of the individual is converted to a first-tier connection by the individual working on a project with the second-tier connection.

14. The computer-implemented method of claim 6, wherein the rating represents a popularity rating.

15. The computer-implemented method of claim 14, wherein the popularity rating is based on a current STARmeter rating.

16. The method of claim 6, wherein the individual is at least one of an actor, a director, a writer, or a producer.

17. The computer-implemented method of claim 6, wherein the project is at least one of a performance, a book, a screenplay, or a photo shoot.

18. A computer-implemented method of determining a networking power of an individual, the computer-implemented method comprising:
   identifying, by at least one processor of one or more computer systems, as first-tier connections, a plurality of individuals who have worked with the individual on a previous project;
   obtaining, by the one or more computer systems, a popularity rating of the individual and of each of the first-tier connections;
   for each of the first-tier connections, determining a utility indicator of a relationship between the individual and the first-tier connection by:
      calculating, by the least one processor of the one or more computer systems, a leverage value by determining a difference between the popularity rating of the individual and the popularity rating of the first-tier connection, the leverage value being indicative of the amount of leverage the individual has in the relationship between the individual and the first-tier connection; and
      combining, by the least one processor of the one or more computer systems, the leverage value and the popularity rating of the individual to determine the utility indicator, the utility indicator being directly proportional to the popularity rating and to the leverage value; and
   determining, by the least one processor of the one or more computer systems, the networking power of the individual by aggregating utility indicators for the relationships between the individual and each of the first-tier connections.

19. The computer-implemented method of claim 18, wherein the utility indicator is negative if the popularity rating of the individual is less than the popularity rating of the first-tier connection and the utility indicator is positive if the rating of the individual is greater than the popularity rating of the first-tier connection.

20. The computer-implemented method of claim 18, further comprising:
   for each of the first-tier connections, identifying, by the least one processor of the one or more computer systems, as second-tier connections, a second plurality of individuals who have worked with the first-tier connection on a previous project but who have not worked with the individual on any previous project.

21. The computer-implemented method of claim 20, further comprising:
   weighting, by the least one processor of the one or more computer systems, utility indicators for the relationships between the individual and each of the first-tier connections to have more weight than utility indicators for the relationships between the individual and each of the second-tier connections.

22. The computer-implemented method of claim 20, further comprising:
   determining, by the least one processor of the one or more computer systems, a conversion rate of the individual, the conversion rate being indicative of the rate at which the second-tier connections of the individual are converted to first-tier connections; and
   applying, by the least one processor of the one or more computer systems, the conversion rate to adjust the networking power of the individual.

23. A computer program product embedded in a non-transitory computer-readable medium for determining a networking power of an individual, comprising:
   program code for identifying as first-tier connections a plurality of individuals who have worked with the individual on at least one previous project;
   program code for obtaining a rating of the individual and of each of the first-tier connections;
   program code for determining, for each of the first-tier connections, a leverage indicator for a relationship between the individual and the first-tier connection by comparing the rating of the individual with the rating of the first-tier connection, the leverage indicator being indicative of an amount of leverage the individual has in the relationship between the individual and the first-tier connection; and
   program code for determining the networking power of the individual at least in part by aggregating leverage indicators for the relationships between the individual and each of the first-tier connections.

24. The computer program product embedded in the non-transitory computer-readable medium of claim 23, further comprising:
   program code for identifying, for each of the first-tier connections, as second-tier connections, a second plurality of individuals who have worked with the first-tier connection on a previous project but who have not worked with the individual on any previous project.

25. A system for determining a networking power of an individual, comprising:
   a processor; and
   a memory device including instructions that, when executed by the processor, cause the processor to:
      identify, as first-tier connections, a plurality of individuals who have worked with the individual on at least one previous project;
      obtain a rating of the individual and each of the first-tier connections;
      for each of the first-tier connections, determine a leverage indicator for a relationship between the individual and the first-tier connection by comparing the rating of the individual with the rating of the first-tier connection, the leverage indicator being indicative of an amount of leverage the individual has in the relationship between the individual and the first-tier connection; and
      determine the networking power of the individual at least in part by aggregating leverage indicators for the relationships between the individual and each of the first-tier connections.

26. The system of claim 25, wherein the memory device further includes instructions that, when executed by the processor, cause the processor to:
   for each of the first-tier connections, identify, as second-tier connections, a second plurality of individuals who have worked with the first-tier connection on a previous project but who have not worked with the individual on any previous project.

* * * * *